US005965242A

United States Patent [19]

Patton et al.

[11] Patent Number: 5,965,242

[45] Date of Patent: Oct. 12, 1999

[54] GLOW-IN-THE-DARK MEDIUM AND METHOD OF MAKING

[75] Inventors: David L. Patton, Webster; Alodia M. Schwark; David L. Cole, both of Rochester, all of N.Y.

[73] Assignee: Eastman Kodak Company, Rochester, N.Y.

[21] Appl. No.: 08/803,048

[22] Filed: Feb. 19, 1997

[51] Int. Cl.$^{6}$ .......... B32B 9/00

[52] U.S. Cl. .......... 428/195; 428/203; 428/204; 428/205; 428/207; 428/323; 428/327; 428/488.4; 428/690; 428/913; 430/21; 430/139; 283/81; 250/462.1

[58] Field of Search .......... 428/203, 690, 428/195, 204, 207, 323, 913, 488.4; 250/462.1, 458.1, 483.1; 40/542, 544; 283/81; 430/139, 495, 21

[56] References Cited

U.S. PATENT DOCUMENTS

| | | | |
|---|---|---|---|
| 4,035,652 | 7/1977 | Schroeder | 250/462 |
| 4,237,381 | 12/1980 | Schroeder | 250/462 |
| 4,308,327 | 12/1981 | Bird et al. | 430/15 |
| 4,365,018 | 12/1982 | Crutchfield et al. | 430/139 |
| 4,401,050 | 8/1983 | Britt et al. | 116/205 |
| 4,424,449 | 1/1984 | O'Brill | 250/461.1 |
| 4,472,479 | 9/1984 | Hayes et al. | 428/324 |
| 4,501,683 | 2/1985 | Arakawa et al. | 252/301.26 |
| 4,543,308 | 9/1985 | Schumann et al. | 430/21 |
| 4,684,592 | 8/1987 | Matsuda et al. | 430/6 |
| 4,741,993 | 5/1988 | Kano et al. | 430/536 |
| 4,816,369 | 3/1989 | Matsuda et al. | 430/139 |
| 4,865,944 | 9/1989 | Roberts et al. | 430/495 |
| 4,866,025 | 9/1989 | Byers et al. | 503/227 |
| 4,871,714 | 10/1989 | Byers et al. | 503/227 |
| 4,876,234 | 10/1989 | Henzel | 503/227 |
| 4,876,237 | 10/1989 | Byers et al. | 503/227 |
| 4,919,855 | 4/1990 | Thomas . | |
| 5,073,843 | 12/1991 | Magee | 362/84 |
| 5,149,568 | 9/1992 | Beck | 428/14 |
| 5,244,861 | 9/1993 | Campbell et al. | 503/227 |
| 5,257,785 | 11/1993 | Sugie | 273/157 R |
| 5,270,100 | 12/1993 | Giglio | 428/195 |
| 5,300,783 | 4/1994 | Spencer et al. | 250/462.1 |
| 5,322,713 | 6/1994 | van Ooij et al. | 427/327 |
| 5,376,801 | 12/1994 | Saotome et al. | 250/482.1 |
| 5,380,636 | 1/1995 | Malfatto et al. | 430/503 |
| 5,532,104 | 7/1996 | Goto | 430/139 |

FOREIGN PATENT DOCUMENTS

| | | |
|---|---|---|
| 0 196 675 | 10/1986 | European Pat. Off. . |
| 0 218 922 | 4/1987 | European Pat. Off. . |
| 0 389 122 | 9/1990 | European Pat. Off. . |
| 2 143 065 | 1/1985 | United Kingdom . |

*Primary Examiner*—Deborah Jones
*Assistant Examiner*—Abraham Bahta
*Attorney, Agent, or Firm*—Frank Pincelli

[57] ABSTRACT

A medium having a phosphorescent material, and a system and method for producing images on the medium using a digital printer. The medium comprises a phosphorescent layer having a phosphorescent material and an image receiving layer disposed over the phosphorescent layer. The image receiving layer is substantially translucent and capable of retaining an image from a digital printer. The medium may comprise a thin plastic film having a resin coating on at least on surface of the film that has been co-extruded with a resin coating having a phosphorescent material dispersed therein. A scanner or computer can be used for obtaining a digital record file of an image which is forwarded to a digital printer.

15 Claims, 9 Drawing Sheets

GLOW-IN-THE-DARK MEDIUM AND METHOD OF MAKING

FIELD OF THE INVENTION

The present invention relates to a medium having a phosphorescent material, and a system and method for producing images on the medium using a digital printer.

BACKGROUND OF THE INVENTION

U.S. Pat. No. 5,270,100 discloses the use of a phosphorescent substrate to which there is applied a translucent color material so as to permit the user to observe the colors of the translucent material in the substrate in the dark. The '100 reference teaches placing a drawing thereon using a translucent drawing medium, such as crayon or felt tip highlighting pen. This reference describe various forms of substrate onto which the phosphorescent material can be applied. The reference further discloses coating of the phosphorescent layer with a protective coating on which the translucent image is to be placed. A problem acknowledged by the '100 reference is that putting a protective coating onto the substrate may interfere with the ability to apply the colored ink. A further problem with such a system is its inability to modify, correct, store or reprint images to be placed thereon. The prior art has also been limited its ability to provide personalized phosphorescent images in an economical and efficient manner.

Applicants have developed an improved medium and method for applying a personalized image onto a phosphorescent material in a economical, efficient manner. The method also allows the images to be modified, stored and reprinted as desired.

One object of the present invention is to provide a method that allows users to permanently imprint their images onto a phosphorescent substrate using commercially available inkjet printers and/or thermal printers utilizing commercially available inks and/or dyes.

A second object of the present invention is to provide a phosphorescent medium that provides protection from ultraviolet B radiation and physical abrasion of the image and of phosphorescent coating while not interfering with the application of the inks and/or dyes, while maintaining or improving the receding quality of the ink and/or dyes and thus maintaining or enhancing the image quality of the output medium.

A third object of the present invention is to provide a phosphorescent medium that can be used with commercially available inkjet printers and thermal printers utilizing commercially available ink and/or dyes.

A further object of the present invention is to provide a method for using digitized images and a method for printing these images onto phosphorescent medium.

SUMMARY OF THE INVENTION

In accordance with one aspect of the present invention there is provided a medium for use in a digital printer. The medium comprises a phosphorescent layer having a phosphorescent material and an image receiving layer disposed over the phosphorescent layer. The image receiving layer is substantially translucent or transparent and capable of retaining an image from the printer.

In accordance with another aspect of the present invention there is provided a method of producing an image on a medium having a phosphorescent layer and a receiving layer for accepting an image from a digital printer. The receiving layer is disposed over the phosphorescent layer and being substantially translucent or transparent. The method comprising the steps of:

a) providing the medium in a digital printer for accepting an image from the printer; and b) printing the image on the receiving layer with the printer.

In accordance with another aspect of the present invention there is provided a method of making a thin plastic film having a phosphorescent layer, comprising the steps of:

a) co-extruding a thin plastic film having a resin coating on at least on surface of the film, the resin coating having a phosphorescent material dispersed therein;

b) providing a receiving layer over the resin coating; and c) providing a protective coating over the receiving layer.

In accordance with yet another aspect of the present invention there is provided a system for producing personalize image on a medium having a phosphorescent layer and a receiving layer placed over the phosphorescent layer. The system, comprising:

means for obtaining a digital record file of an image;

a digital printer for printing the image on the medium, and;

means for forwarding the digital record file to the printer for printing.

DESCRIPTION OF THE DRAWINGS

Other objects, advantages and features of the present invention will become apparent from the following specification when taken in conjunction with the drawings in which like elements are commonly enumerated and in which.

DESCRIPTION OF THE PREFERRED EMBODIMENT

Figure 1:
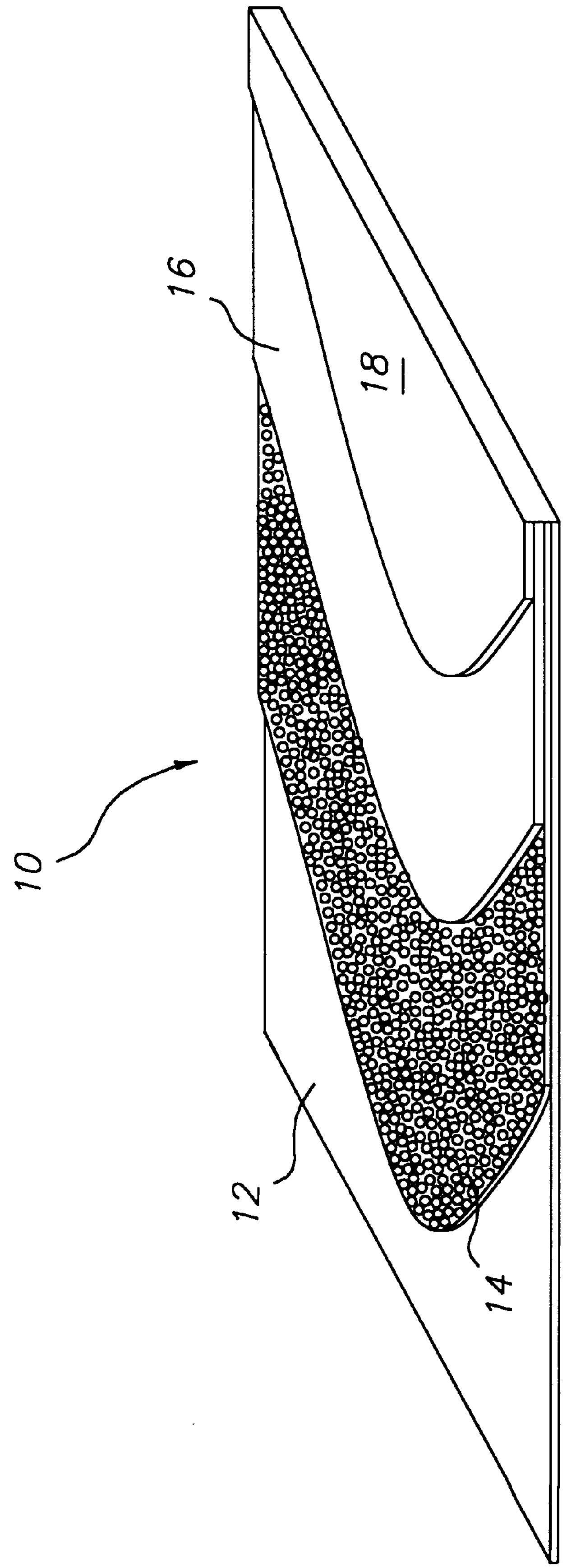
FIG. 1 is a perspective view of a medium having a phosphorescent layer which can be used with an inkjet printer, partially broken away to illustrate the various layers.

Referring to FIG. 1, there is illustrated a perspective view of a medium 10 for use in a digital printer such as an inkjet printer. The medium 10 comprises a support layer 12. In the particular embodiment illustrated, the support layer 12 is paper, for example, photographic paper without the emulsion. Over support layer 12 there is provided a phosphorescent layer 14 which comprises a phosphorescent pigment, such as copper-doped zinc sulfide, dispersed in a binder, such as methylcellulose or gelatin. While in the embodiment illustrated, a separate phosphorescent layer 14 is provided, the phosphorescent pigment may be incorporated directly into the support layer 12 and thus eliminate a separate phosphorescent layer. A translucent or transparent receiving layer 16 is provided over the phosphorescent layer 14 The receiving layer 16 is designed to receive an image placed thereon by a printer. In the embodiment illustrated, the translucent or transparent receiving layer 16 comprises a gelatin and polymer having a 50:50 mix ratio. The gelatin may be any commercially available gelatin as is well known by those skilled in the art. The polymer is AQ55, which may be purchased from the Eastman Chemical Corporation. Placed over the translucent receiving layer is a protective transparent or translucent layer 18, which in the particular embodiment illustrated is methylcellulose. The phosphorescent layer, receiving layer 16 and protective latter may be applied in any of the well coating techniques used for applying a thin layer on a substrate. The thickness of each of the layers 14, 16 and 18 are relative thin, but may be varied to obtain the desired affect. In the embodiment illustrated phosphorescent layer 14 will typically have thickness in the range of about 0.01 mm to about 0.1 mm, receiving layer 16 having a thickness in the range of about 0.002 mm to about 0.05 mm, and protective layer 18 having a thickness in the range of about 0.0005 mm to about 0.02 mm.

Figure 2:
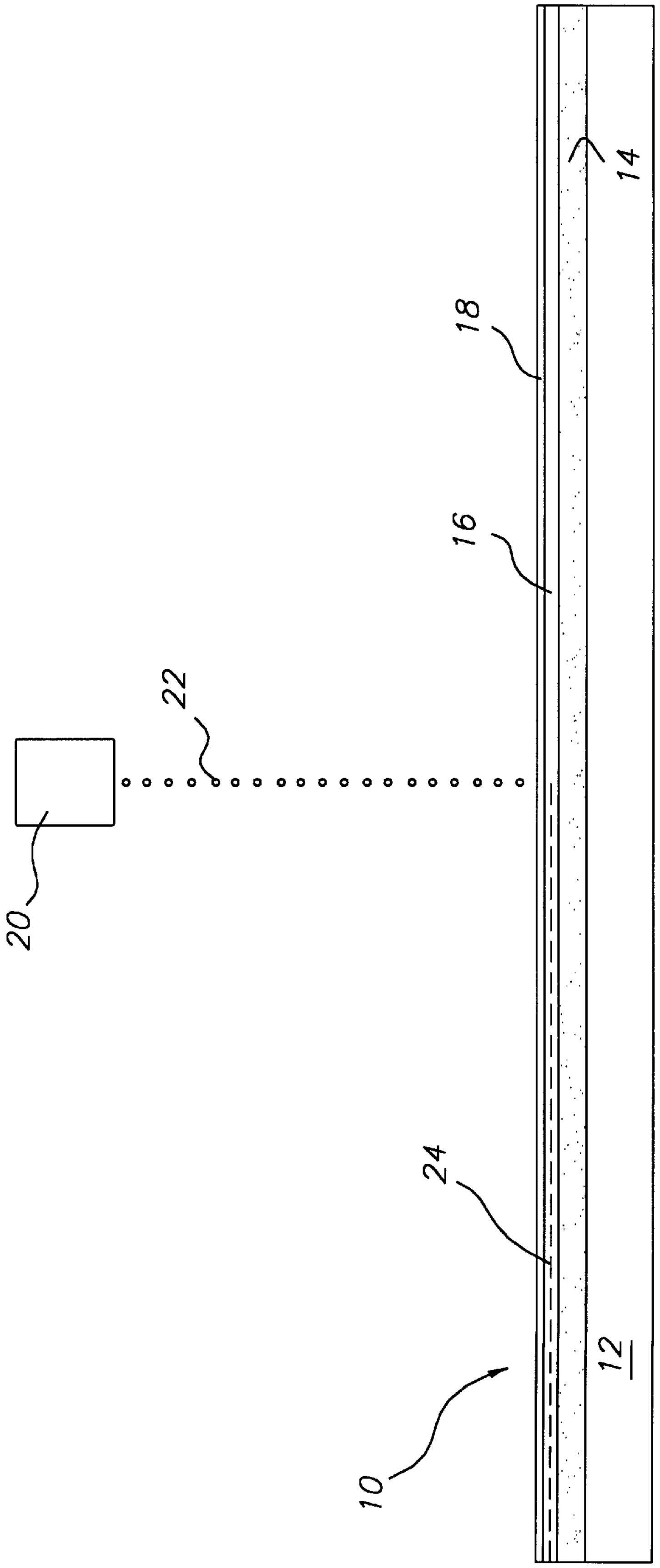
FIG. 2 is a schematic drawing illustrating the application of ink being applied via an inkjet printer onto the phosphorescent medium of FIG. 1.

Referring to FIG. 2, there is illustrated a schematic view of medium 10 with an image being applied via an inkjet printer head 20 found in a typical prior art inkjet printer. For example, head 20 may be of any commercial type found in the following printers: Canon BJC-610, BJC-4100, Hewlett Packard HP682, HP855, HP870, or Epson Stylus 500. The ink 22, may be of as any commercially available ink used by these printers. The ink 22 passes through the protective layer 18 and is absorbed by the receiving layer 16. As is illustrated in FIG. 2, the image 24 is formed in the translucent receiving layer 16. When the medium 10 is placed in the dark, the phosphorescent layer 14 glows, illuminating the image through the translucent layer 16. The protective overcoat 18 shields and protects the image 24 and also the phosphorescent layer 14 from abrasion and UV rays.

Figure 3:
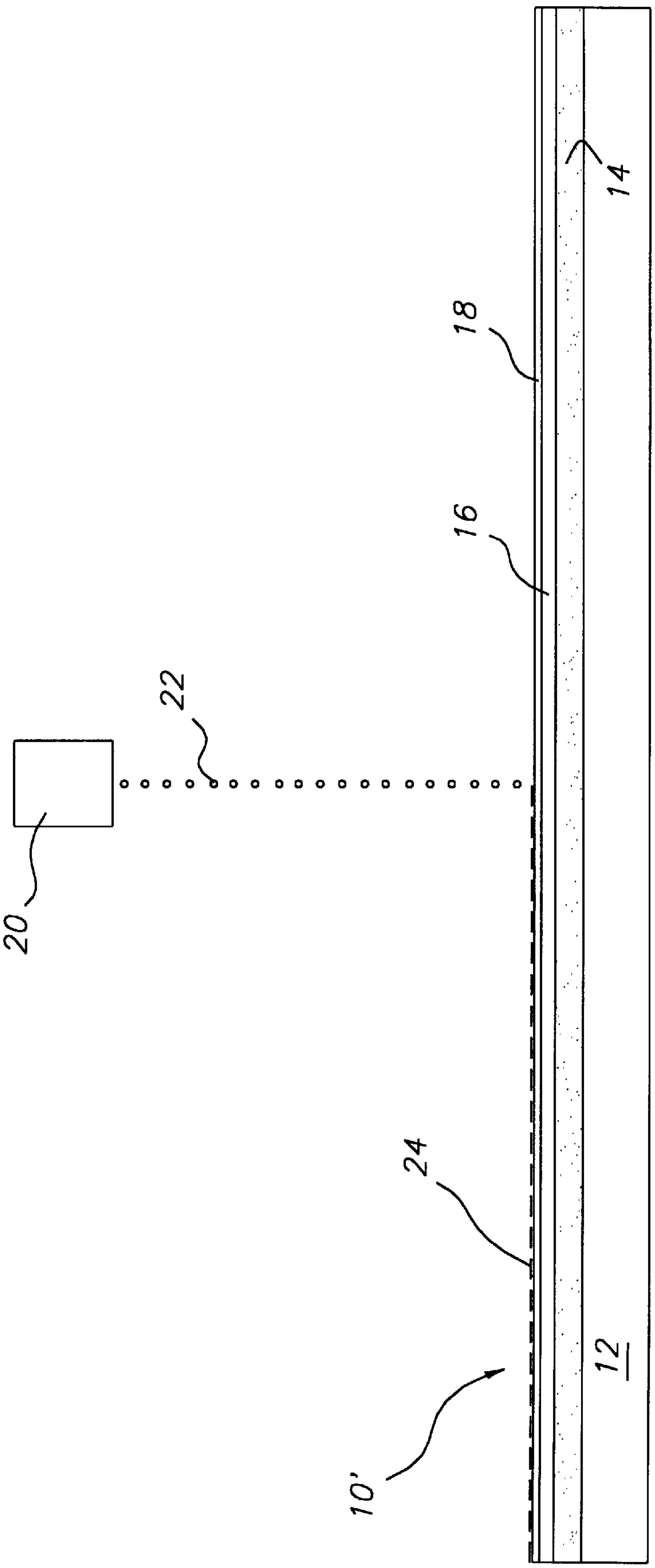
FIG. 3 is a view similar to FIG. 2 illustrating a modified ink as used.

Referring to FIG. 3 there is illustrated a modified medium 10' made in accordance with the present invention. Medium 10' is similar to medium 10, like numerals indicating like parts. In this embodiment the ink 22 is placed on overcoat layer 18. Thus, the layer 18 is made an appropriate material for accepting ink 22. While this is not preferred as the image is not protected from abrasion, the phosphorescent layer 14 is still protected from abrasion and harmful light rays, for example, ultraviolet B radiation. If desired the receiving layer 16 may be omitted in this embodiment as the protective layer also acts as the image receiving layer.

Figure 4:
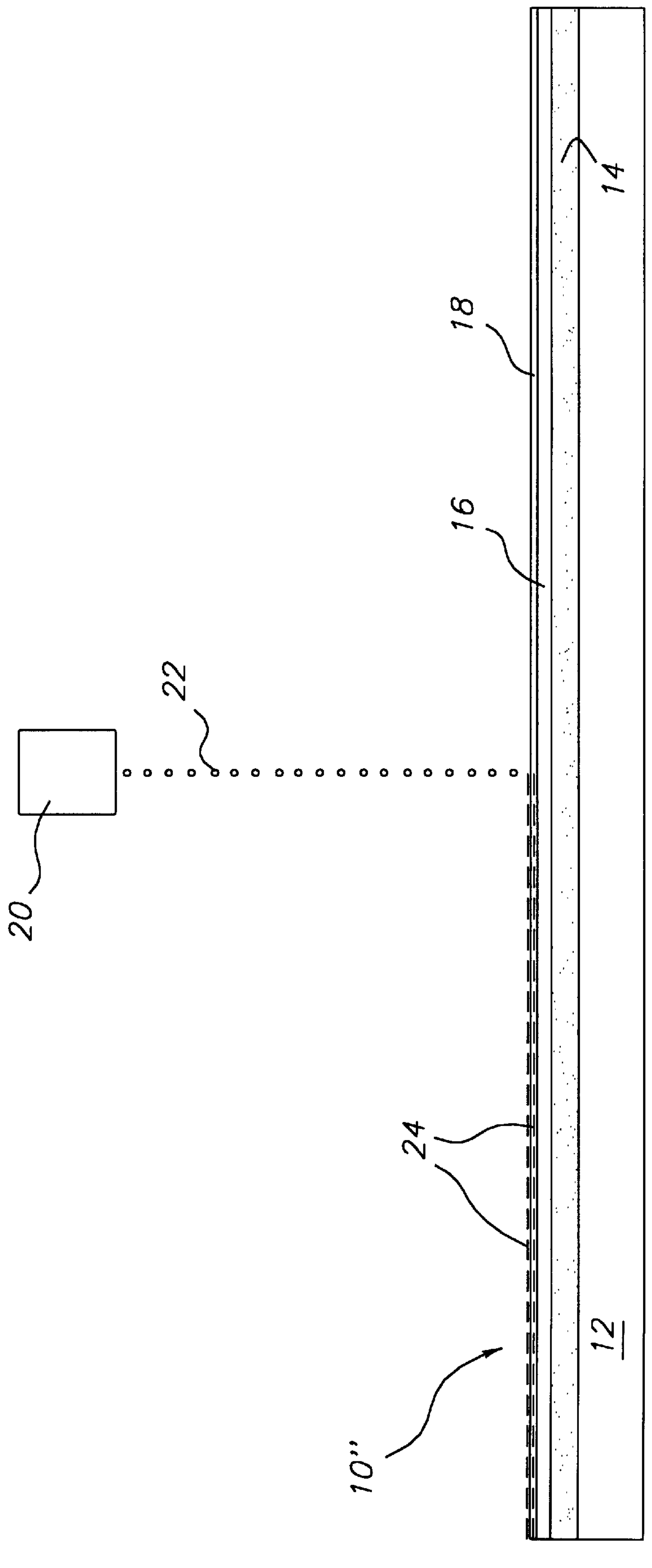
FIG. 4 is a view also similar to FIG. 2 illustrating yet another modified ink being applied.

FIG. 4 is a view similar to FIG. 2, except in this embodiment the medium 10" is designed such that some of ink 22 passes below the protective layer 18 into the receiving layer 16, while some of the ink 22 is maintained on layer 18. Here again, this is not preferred, but the phosphorescent layer is still protected and a portion of the image is also protected.

Figure 5:
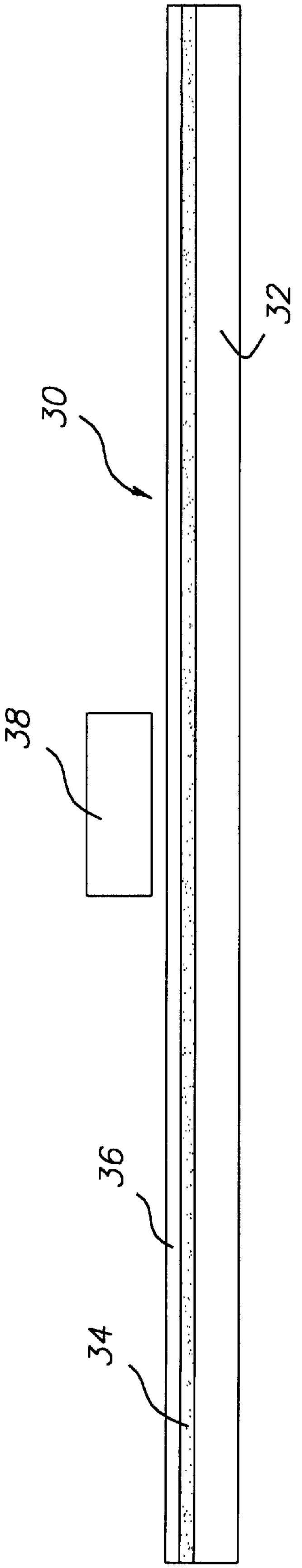
FIG. 5 is a schematic view illustrating an application of an image onto a thermal medium incorporating a phosphorescent layer according to the present invention.

Referring to FIG. 5, there is illustrated a thermal medium 30 made in accordance with the present invention. In particular, the thermal medium 30 includes a support layer 32 as is typical with thermal medium. A phosphorescent layer 34, which in the particular embodiment illustrated includes a pigment, such as copper-doped zinc sulfide, dispersed in a binder such as polyethylene. A receiving layer 36 is provided over phosphorescent layer 34. A thermal head 38 is used for placing an image on medium 30 as is customarily done in such thermal printers.

Figure 6:
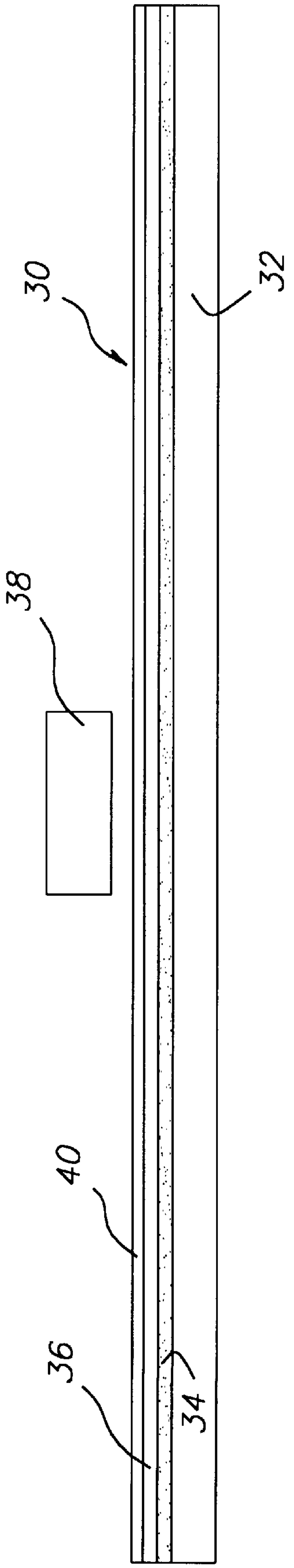
FIG. 6 is view similar to FIG. 5 illustrating a modified medium made in accordance with the present invention.

FIG. 6 is similar to FIG. 5, except that a protective coating 40 is provided over receiving layer 36. The protective layer 40 works in the same manner previously described for layer 18.

Figure 7:
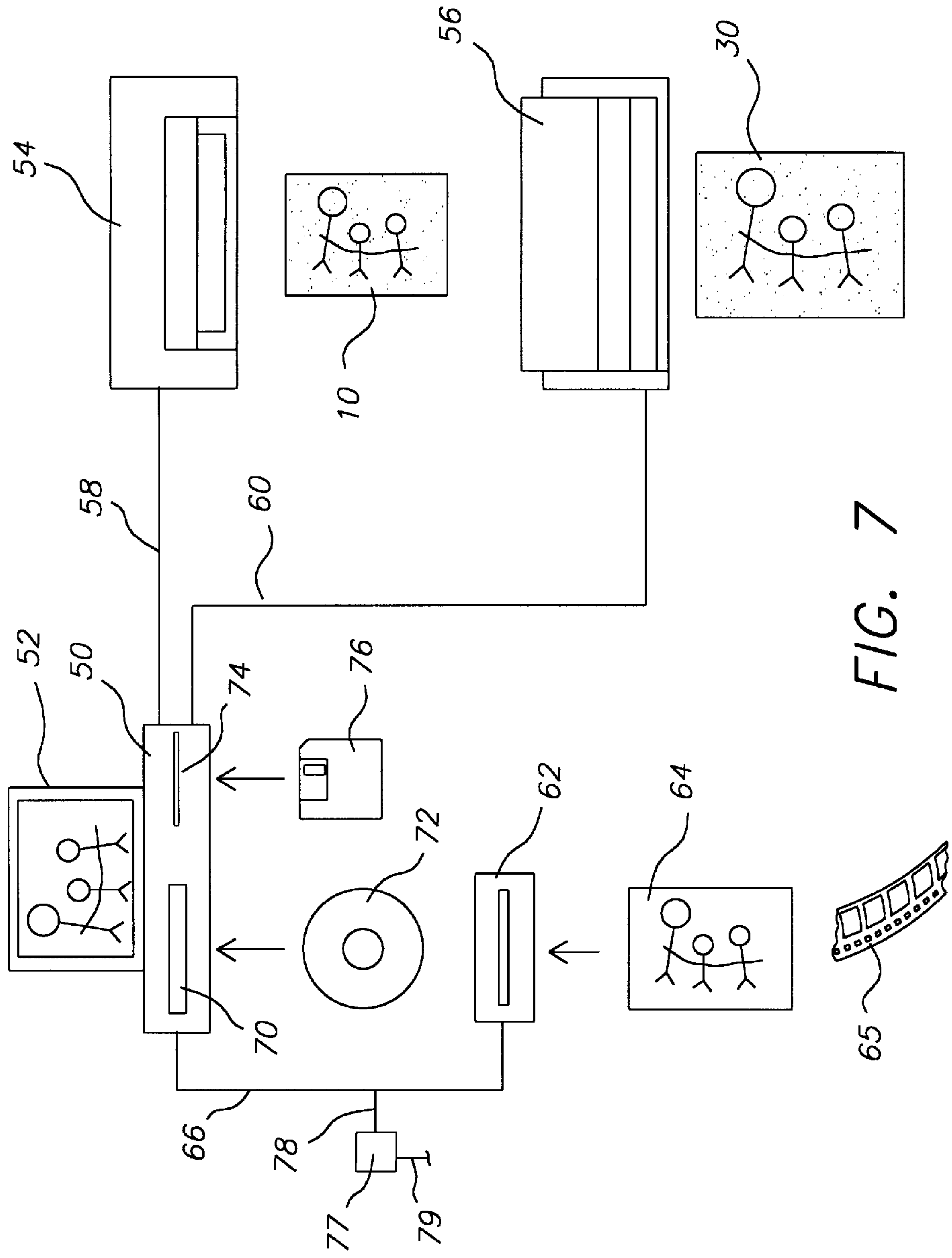
FIG. 7 is a schematic diagram illustrating a system for making phosphorescent medium in accordance with the present invention.

Referring to FIG. 7, there is illustrated a schematic diagram of a system for printing images onto a medium 10, 10', 10", or 30. In particular, the system includes a computer 50 having a display monitor 52. The computer 50 is hooked up to at least one digital printer. In the embodiment illustrated, the computer 50 is linked to an inkjet printer 54 and thermal printer 56 by appropriate cables 58,60. Computer 50 is also connected to a scanner 62 which may be used to a obtain a digital record file of an image, for example, from a photographic print 64 or film 65. Scanner 62 is connected to computer 50 by appropriate cable 66. The computer 50 also includes a CD ROM drive 70 for receiving a CD 72 and a disc drive 74 for receiving a computer disc 76. CD ROM drive 70 and disc drive 74 illustrate other methods in which a digital record file of an image may be obtained for printing. The computer 50 is hooked up to a modem 77 via a cable 78. The modem is connected via cable 79 to a phone line and hence to the Internet, which illustrates another method in which digital record files of an image may be obtained for printing.

As is typical of scanner 62, a print 64 or film 65 may be placed therein and a digital record file regarding an image is obtained and passed onto computer 50. The captured digital image may be manipulated, corrected or otherwise modified as desired. After manipulating the image as desired, the digital record file is passed on to at least one of the printers 54,56 for printing on a medium 10, 10', or 10". Alternatively, a medium 30 can be placed into thermal printer 56 whereby an image is printed on the thermal medium 30. The captured digital image can also be stored or transmitted to another computer where it can again printed or viewed.

Figure 8:
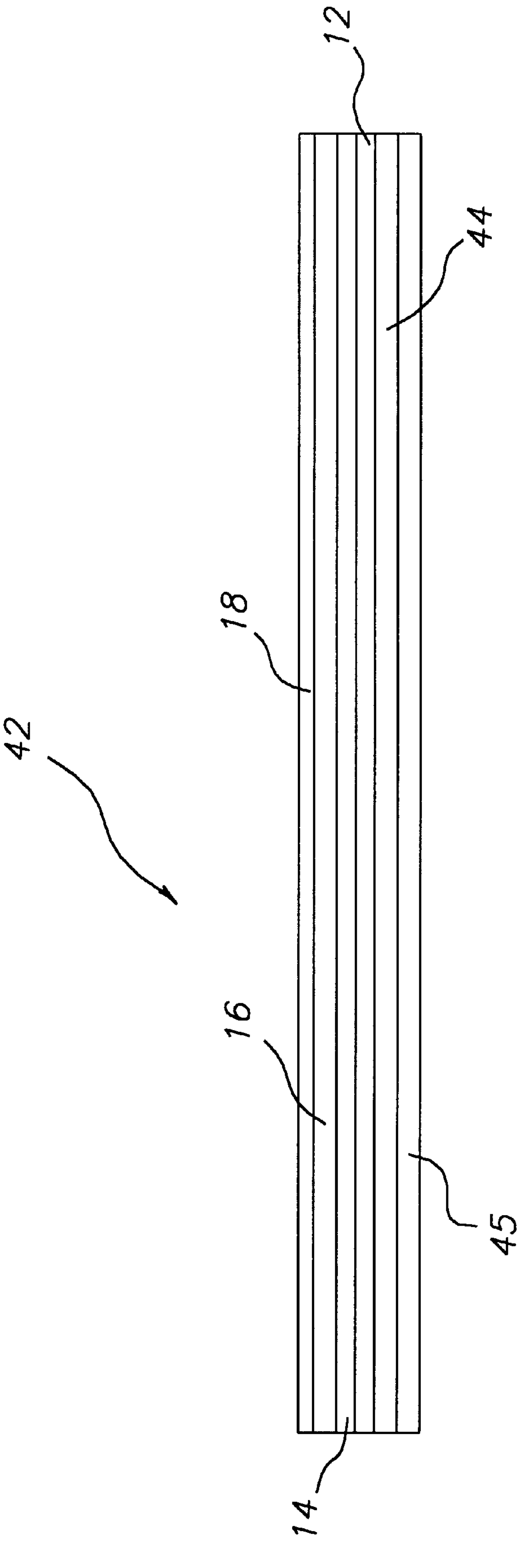
FIG. 8 is a cross-sectional view of a modified medium made in accordance with the present invention.

Referring to FIG. 8, there is illustrated a modified medium 42 made in accordance with the present invention. Medium 42 is similar to medium 10, like numerals indicating like elements and function. In this embodiment an adhesive layer 44 is provided on the back of support layer 12. A peelable protective release layer 45 is provided over adhesive layer 44 for protecting the adhesive layer 44 until it is to be used for securing the medium 42 to a surface. After the image has been printed on the medium 42, the release layer 45 is peeled off the adhesive layer 44 whereby the medium 42 is secured to the desired surface.

Figure 9:
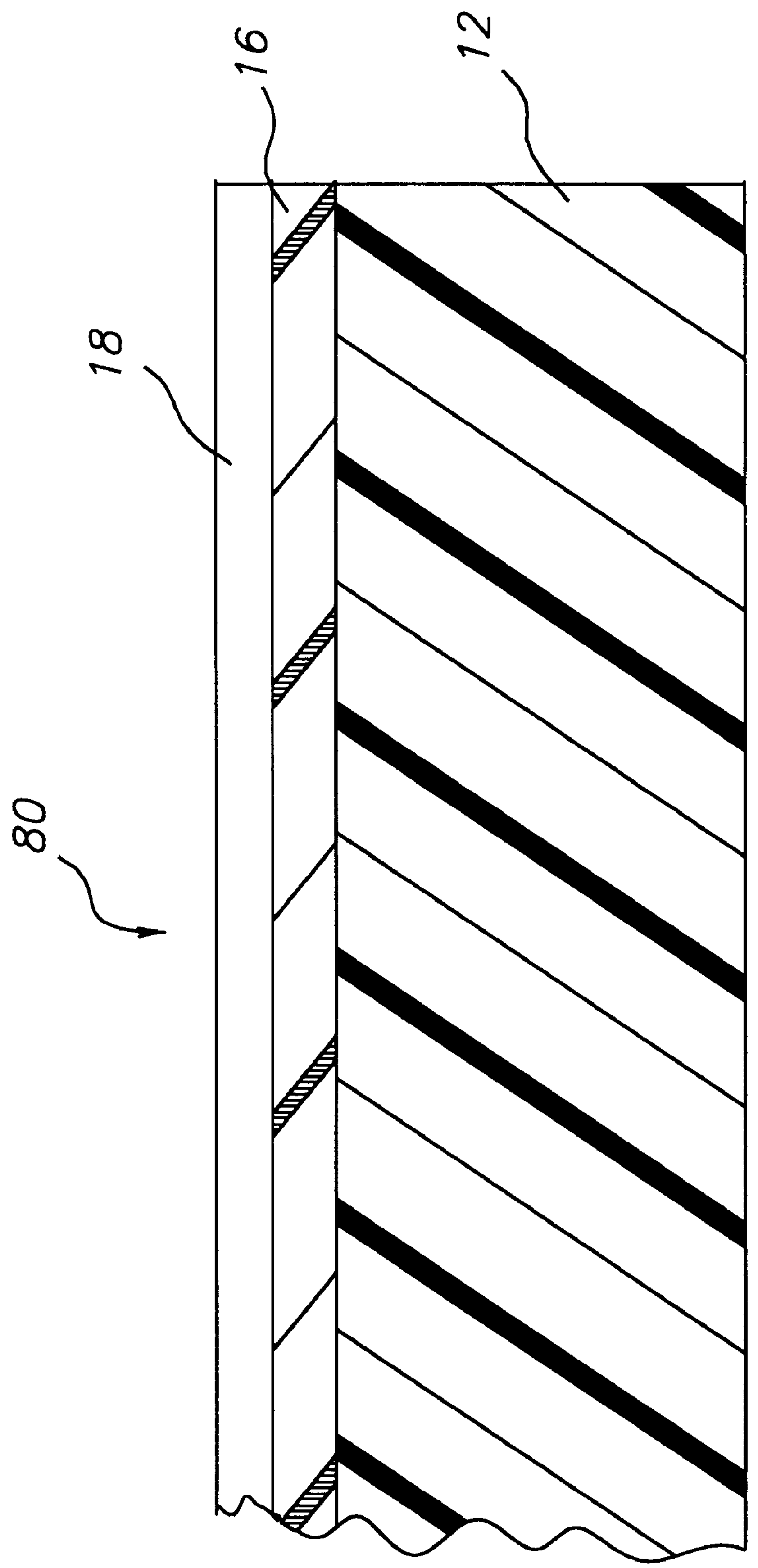
FIG. 9 is a cross-sectional view of another modified medium made in accordance with the present invention.

Referring to FIG. 9, there is illustrated yet another modified medium 80 made in accordance with the present invention. Medium 80 is similar to medium 10, like numerals indicating like elements and function. The phosphorescent material is dispersed in receiving layer 16 and protective layer 18 is provided over layer 16. A separate phosphorescent layer is thus eliminated.

Figure 10:
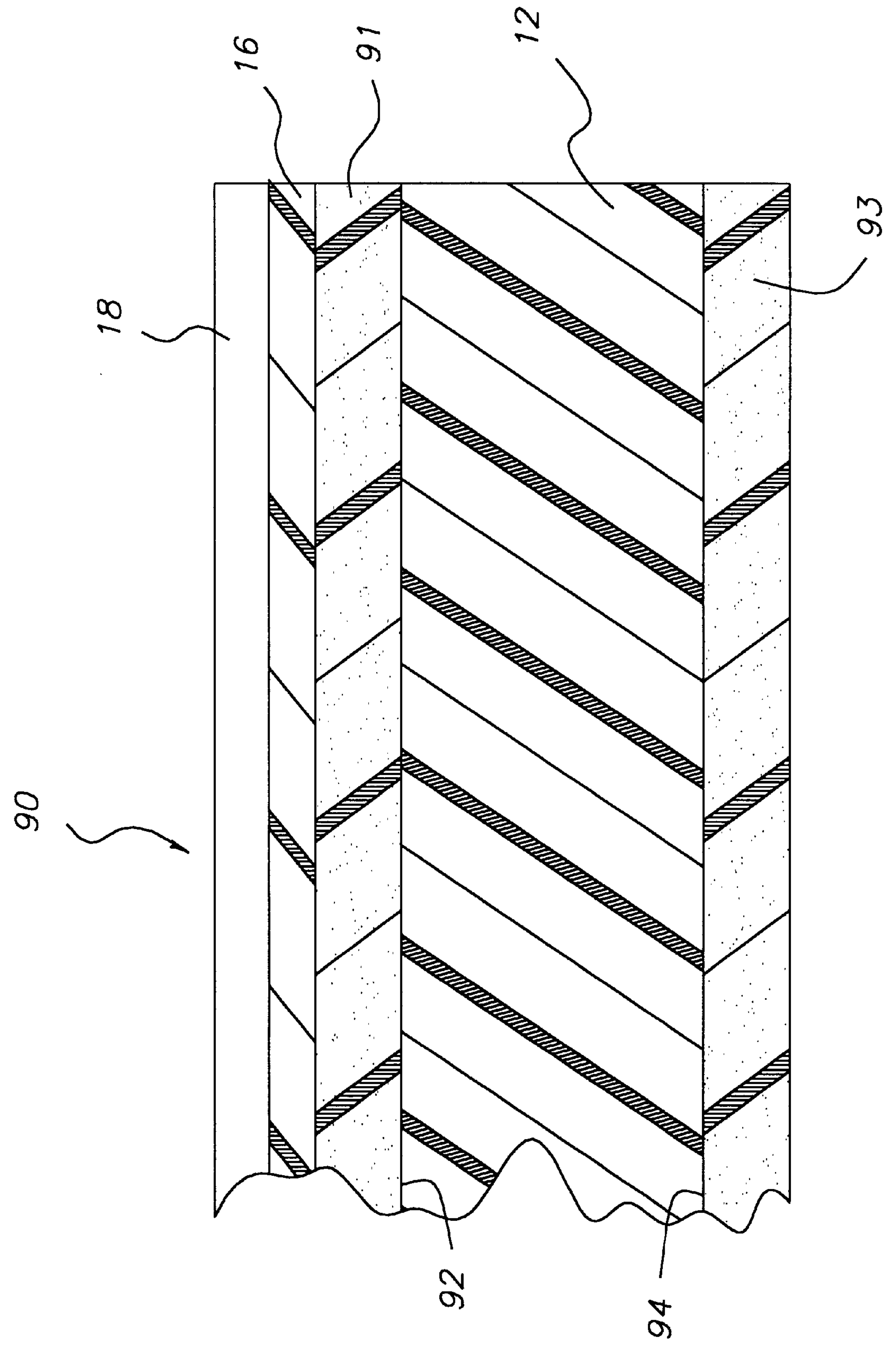
FIG. 10 is a cross-sectional view of still another medium made in accordance with the present invention.

Referring to FIG. 10, there is illustrated yet another medium 90 made in accordance with the present invention, like numerals indicating like elements as previously described. In this embodiment, the support layer 12 is a thin plastic translucent film of the type used in photographic film. In the particular embodiment illustrated, layer 12 is made of polyethylene terephthlate or polyethylene naphthlate. In this embodiment, support surface 12 is co-extruded with a resin coating 91 on the top surface 92 of medium 90 and resin coating 93 on the bottom surface 94 of support surface 12. The co-extrusion of support surface with coatings is accomplished using well know techniques known to those skilled in the art of extruding film. In the embodiment illustrated, the resin coating 93 is polyethylene. The phosphorescent pigment is dispersed in one or both of the coatings 91,93. In the embodiment illustrated, the phosphorescent pigment is provided only in coating 91. A receiving layer 16 is provided over coating 91 and a protective layer 18 is provided over coating 93.

As can be seen from the foregoing, that personalized prints can be made quickly and easily having glow-in-the-dark characteristics and wherein the images are protected against abrasion and/or ultraviolet B radiation discoloration.

It is to be understood that various other changes and modifications may be made without departing from the scope of the present invention, the present invention being defined by the following claims.

Parts List:

| | |
|---|---|
| 10, 10'10" | medium |
| 12 | support layer |
| 14 | phosphorescent layer |
| 16 | translucent receiving layer |
| 18 | protective layer |
| 20 | inkjet printer head |
| 22 | ink |
| 24 | image |
| 30 | thermal medium |
| 32 | support layer |
| 34 | phosphorescent layer |
| 36 | receiving layer |
| 38 | thermal head |
| 40 | protective layer |
| 42 | modified medium |
| 44 | adhesive layer |
| 45 | release layer |
| 50 | computer |
| 52 | display monitor |
| 54 | inkjet printer |
| 56 | thermal printer |
| 58, 60, 66 | cable |
| 62 | scanner |
| 64 | photographic print |
| 65 | film |
| 70 | CD ROM drive |
| 72 | CD |
| 74 | disc drive |
| 76 | computer disc |
| 77 | modem |
| 78,79 | cable |
| 80,90 | modified medium |
| 91,93 | resin coating |
| 92 | top surface |
| 94 | bottom surface |

We claim:

1. A medium for use in a digital printer having a phosphorescent layer and an image receiving layer disposed over said phosphorescent layer, said image receiving layer being substantially translucent or transparent and capable of retaining an image from said printer.

2. A medium according to claim 1 wherein medium includes a support layer having a top surface and bottom surface, said phosphorescent layer being disposed on the top or bottom surface.

3. A medium according to claim 2 wherein support layer is paper.

4. A medium according to claim 1 wherein said phosphorescent layer comprises a phosphorescent pigment in a binder.

5. A medium according to claim 4 wherein said phosphorescent pigment comprises copper-doped zinc sulfide.

6. A medium according to claim 1 wherein said receiving layer comprises a binder and a polymer.

7. A medium according to claim 1 wherein a protective layer is provided over said receiving layer.

8. A medium according to claim 7 wherein said protective layer comprises methylcellulose.

9. A medium according to claim 2 wherein said phosphorescent material is provided in said support layer.

10. A medium according to claim 2 wherein said support layer is a plastic film.

11. A medium according to claim 2 wherein said support layer is extruded.

12. A medium according to claim 10 wherein said support layer is co-extruded with a resin coating.

13. A medium according to claim 2 wherein an adhesive coating is provided on the surface opposite the surface on which the phosphorescent layer is placed, a peelable release layer is placed over said adhesive layer which can be peeled off for allowing the adhesive coating to be secured to a surface.

14. A medium for use in a digital printer having a phosphorescent layer and a receiving layer that permanently accepts a marking medium, said receiving layer being disposed over said phosphorescent layer and being substantially translucent or transparent, a protective translucent or transparent layer is provided over said receiving layer.

15. A medium for use in a printer having a phosphorescent layer and an image receiving layer disposed over said phosphorescent layer, said image receiving layer being substantially translucent or transparent and capable of retaining an image from said printer, and a protective layer provided over said receiving layer.

* * * * *